Patented June 2, 1953

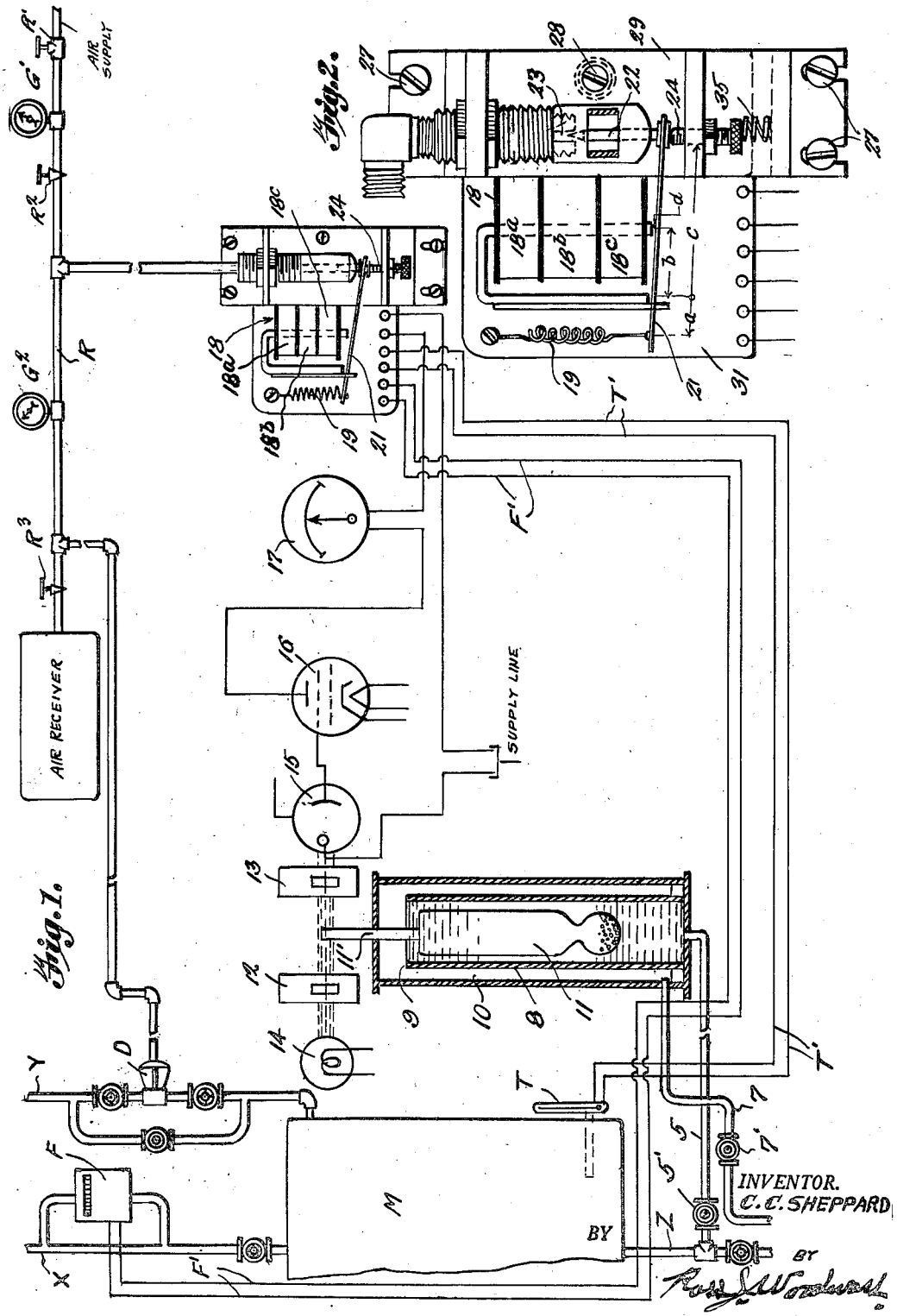

2,640,496

UNITED STATES PATENT OFFICE 2,640,496

PLURAL SOLENOID ELECTROMAGNETIC VALVE

Creedy C. Sheppard, Bergenfield, N. J.

Application December 8, 1948, Serial No. 64,139

2 Claims. (Cl. 137—727)

This invention relates to an electro-pneumatic control system and the main object of the invention is to provide pneumatic proportional control to a process or operation in which the determining factor of the process is measured electrically. In the petroleum, chemical and many other industries pneumatic control is desired because of its simplicity and to prevent the hazards necessitated by electrical controls in the presence of vapors and other explosive mixtures. For this reason it is almost universal to use pneumatic diaphragm valves or other pneumatic means for regulating the process.

At the same time it is convenient to measure electrically many of the functions such as temperature, humidity, specific gravity which control the process. I am aware that many controls now measure electrically and by means of a recorder or other mechanism convert the measurement into pneumatic control. However most of these systems control the pneumatic mechanism by means of a flapper covering an orifice the flapper being actuated by a linkage to the recorder, indicator, or other measuring element. This type of control is limited by the small motion of the flapper (usually but a few thousandths of an inch and limited in any event, to a distance equal to one-fourth the diameter of the orifice) necessary to control the pressures. It is thus necessary to introduce linkages levers and other magnifying devices to operate the control of the flapper. Even with the most precise linkages it is difficult to translate such small movements accurately.

In my invention, the pressure which actuates the device, instead of being controlled by a flapper, is determined by the position of a needle valve in an orifice acting as the leak to establish proper pressure. The area of the leak which determines the pressure is the difference between the diameter of the orifice and that of the needle at any given position. The pitch of the needle point determines the amount of motion necessary to produce a given leak area. The shape of the needle determines the relation between motion and leak. A straight cone shaped needle gives a parabolic relation between motion and orifice. A parabolic shaped needle will give a straight line relation between motion and area. The position of the needle at any given moment is determined by a magnetic armature actuated by a coil in which the magnetic force is proportional to an electrical measurement of the variable.

The position of the needle valve in my invention is determined by the strength of a magnetic field produced by the electrical measuring element. It is therefore displaced in proportion to the exciting effect of the measured value—small changes producing a small variation in the control and larger changes a large variation in the control.

One specific application of my invention is illustrated in the accompanying drawings wherein:

Fig. 1 is a diagrammatic view of the improved apparatus.

Fig. 2 is a view upon an enlarged scale showing a portion of the apparatus in elevation.

This improved apparatus is to regulate the specific gravity or a process in which two unlike liquids are to be mixed to produce a desired specific gravity. Liquids of different densities are fed to a mixing tank M through pipe lines X and Y to produce a desired value of specific gravity in the effluent line Z. For example pipe line X may be delivering water to the mixing tank and pipe line Y a syrup which mixes with the water to produce a soft drink having a definite amount of sugar as measured by its specific gravity regardless of the rates of flow in pipe line X.

To accomplish this a sample of the resultant liquid is by-passed through pipe 5 controlled by valve 5' and allowed to flow into a chamber 8, having an overflow wier 9 at its top which maintains a constant level in the chamber 8. The liquid which overflows from chamber 8 collects in chamber 10 and is drained away to process or waste through a pipe 7 controlled by a valve 7'. Floating in tank 8 is a hydrometer 11 which will assume a position determined by the specific gravity of the mixture. The hydrometer is provided with a stem 11 which interrupts a light beam passing through shutters 12 and 13 from the light source 14 to the photocell 15. The amount of light reaching the photocell 15 is determined by the height of the float 11 which in turn is a measure of the specific gravity of the sample. Current from photocell 15 is amplified through the amplifier tube 16 and passes through the meter 17 and the electromagnet 18 having coils 18a, 18b and 18c. The amount of current flowing in magnet 18 can be calibrated in terms of the specific gravity of the liquid and will exert a corresponding force on the armature 21 attracted by the magnet. The force on the armature will then be in proportion to the specific gravity of the liquid.

The control mechanism consists of a supply of air entering through a pipe R controlled by valves R1, R2 and R3 and being reduced to a standard pressure indicated on gauge G1, say 15 pounds, by action of the reducing valve R1. This pressure then is restricted as to its flow through variable reducing valve R2 the pressure being indicated on dial G2. The pressure shown on dial G2 is the resultant of the flow through valve R2 and the amount which leaked off through orifice 23, the amount of leak being determined by the position of needle valve 22 which is in turn controlled through the armature 21 by the current flowing through the electromagnet 18. If no current flows through the magnet the needle valve will rest against the stop 24. On the other hand if sufficient current flows through magnet 18 the needle valve 22 will enter the lower end of orifice 23 and close it completely, in which case the pressure will build up until that shown on the dial G2 equals the pressure shown on dial G1.

Since the position of the needle valve is determined by the armature flux it is quite possible to take into account a number of factors in determining the final flux. In the pneumatic control art it is current practice to have features in the device to anticipate the action of the control due to sudden change in the variables, to modulate it according to the rate of change, and the like.

In my apparatus the magnet 18 has three separate coils 18a, 18b, and 18c. Coil 18a determines the magnetism contributed by the position of the float 11 and coil 18b receives an impulse from an electric flow meter F connected with this coil by wires F' and associated with the pipe X. A sudden change in the rate of flow can cause too great an impulse and anticipate its effect in the mixing tank M, also asserting a corresponding force on the armature 21. In the mixing tank itself the reactions or the results may be influenced by temperature. Therefore I place in the tank M a temperature device T which gives an electrical impulse and is connected with coil 18c by wires T' and causing the flux to be modified according to this factor. Accordingly the resultant position of the armature and the needle valve will be determined by the three modifying the magnetic flux.

The magnetic flux produced by coil 18a may be either increased or decreased by the current flowing in coil 18b depending upon the direction it passes through the coil. It will then add or subtract magnetic force acting on the armature to produce a change induced by the electrical measurements of a second variable in the process. Similarly, coil 18c may add or subtract a magnetic force correcting for a third variable. In Figure 1, corrections dictated by changes in the flow rate of flow meter F and changes of temperature measured by device T are thus added magnetically to determine the resultant position of armature.

The control action is accomplished by a conventional diaphragm valve D mounted in the pipe Y. This valve may be adjusted from a fully opened position to a position in which it is fully closed according to the pressure shown upon the gauge G2. The electrical current in magnet 18 will, therefore, determine pressure in the gauge G2 and the corresponding position of valve D. The position of the needle valve 22 is determined by three forces acting on it; the tension of spring 19, and the pressure in the system as indicated by the gauge G2 acting on the area of the needle valve tending to tilt the armature in a clockwise direction and magnetic pull of magnet 18 tending to operate it in a counterclockwise direction. Each of these three forces has its own leverage action indicated as $a$, $b$, and $c$ in Figure 2 which multiplied by its force equals the moments acting on the armature.

The sum of the moments constitutes the force balance, and needle valve 22 will assume a position to reduce this sum to zero, thus fixing the position to produce proper operating pressure in diaphragm motor D to hold the process steady at the set point until one of the variables changes. A change in the electrical measurement of one of the variable produces a change in magnetism on the armature, and a new balance point. Since the changes in current will be in proportion to the deviation in the set point, the device will function as a proportional controller. Further, since the size of the orifice and the slope, or area of the needle valve for any given position, may be designed to give wide ranges and fine sensitivities to control mechanisms not possible with the flapper mechanism whose total motion is limited to one-fourth the diameter of the orifice and whose major regulation is confined to a still smaller range. A still further advantage is that by making the needle valves and orifice jets interchangeable parts in the control mechanism by merely substituting a piston needle valve and orifice, the control can be quickly changed to an entirely different range and sensitivity. In a plant using large numbers of controllers, this permits standardization on a relative simple and inexpensive mechanism for most control problems, each being adapted to its particular job by inserting proper needle valve piston and orifice.

Further, the effective force of the magnetic pull for any given current can be varied by changing the air gap $d$ between the armature and the pole piece of the magnet. This is accomplished by vertically shifting the bracket 29 which carries the orifice with respect to the bracket 31 carrying the coil 18 by means of the eccentric 28 after loosening the securing screws 27.

A spring 35 is introduced between the bracket 29 and the bracket 31 and serves to separate them to the limit permitted by the eccentric 28. It is only necessary, then, to rotate 28 to produce any desired gap $d$ between the armature 21 and the yoke. It is therefore, possible to produce equilibrium in the system at any desired value of current in the magnet 18 and consequently at any desired specific gravity of the mixed liquid. When this equilibrium is disturbed, by a change in gravity the valve D will be influenced to regulate the flow in the pipe line Y and to restore the gravity to the set point. Furthermore the effect of the pressure on the diaphragm of the valve D will be in proportion to the variation in coil current (and therefore of specific gravity) from the set point, a small change producing a small corrective action and a correspondingly large corrective action.

It is to be noted that the action of the magnet and the armature in the system I have perfected differs materially from that of the conventional electric relay. In the latter case an increase of current causes motion of the armature towards the yoke and as the armature nears the yoke the magnetic gap being lowered the pull of the magnet is increased, the effective force being inversely proportional to the square of the distance across the air gap. This effect causes the characteristic action of the electrical relay which has two definite values called the "pull in" and "drop out" points giving the desired "snap action."

In my device an increase in current through the coil $18a$ of the magnet $18$ acting through its lever arm $b$ moves the needle valve $22$ and restricting the orifice builds up the pressure determined by the leak. This pressure acting through the lever arm $c$ opposes the motion of the armature thus replacing the "snap action" of an ordinary electrical relay with a true floating action depending on the magnetic pull of the magnet acting through its lever arm $b$ and the pressure acting through its lever arm. By suitably adjusting the spring tension and the air gap the equilibrium point can be set any desired value between full pressure and complete leak off or zero pressure.

Furthermore any disturbance of this set pressure will bring into play forces in proportion to the disturbance tending to restore the set pressure, in other words automatic control of the process, tending to maintain the output at any desired set value. The sensitivity of the response can be controlled by regulating the needle valve R2 and if only a small leak is permitted here obviously a small change in leak through orifice 23 will produce a large change in the pressure shown by G2. On the other hand if a greater flow is permitted through valve R2 it will take a correspondingly larger motion of needle valve 22 to establish the pressure.

To overcome objectionable "hunting" of the controlled valve above and below the set point I have provided another needle valve R3 mounted in the portion of the pipe line R leading to a reservoir or air receiver. By means of this valve R3 the rate of flow into and out of the air receiver can be regulated. If we assume that the operating pressure gauge G1 is 15 pounds and the set pressure to provide proper specific gravity is 9 pounds the system will balance at a point in which the leak off at valve 22 will become 9 pounds and this pressure will be present on the diaphragm of valve D and also in the air receiver and the whole system will be at rest as long as the specific gravity corresponds to the set point giving a pressure of 9 pounds.

Now suppose the specific gravity goes up lifting the float 11 and thereby cutting down current in coil $18a$ and permitting more air to escape at orifice 23 by movement of needle valve 22 and reducing pressure on diaphragm valve D thus cutting down the flow of liquid Y and reducing the specific gravity, it being assumed that liquid Y is heavier than liquid X. At this point as the air pressure is reduced air from the receiver will flow into the system tending to prevent the pressure falling too fast in valve D and thus causing it to overshoot the set point and "hunt." The pressure resulting from leak at 22 is made up of two parts; one coming through valve R2 from the air supply and the other coming from the air stored in receiver and escaping through valve R3. By adjusting the valve R3 the amount of this corrective action or "reset action" can be varied to suit the particular limits and sensitivity desired in the apparatus. On the other hand if needle valve 22 moves to increase the pressure in the system, part of the effect is felt at the diaphragm valve D and part of the effect is used to store up pressure in the air receiver. The action of this receiver or reset action is very much like a storage battery floating on an electrical line to absorb changes in voltage and smooth them out.

I have thus provided an apparatus for electrically measuring the end product of a process; any process, and not necessarily the specific one cited; and translating this electrical measurement into pneumatic means to maintain the end product at a given value, the amount of the correction being proportional to the variation from the desired electrical point. Further I have provided reset means to prevent the desired value from hunting and also means for varying the set point, the sensitivity and the reset action by suitable controls.

Having thus described my invention what I claim is:

1. Electrically operated means for controlling leak off from a process control system comprising a vertically disposed chamber having an inlet at its top and an outlet aperture at its bottom, a needle valve under said chamber shiftable vertically into and out of said aperture, an electro-magnet disposed vertically adjacent one side of said chamber and having upper and lower and intermediate positions provided with separate windings adapted to be independently energized, an armature bar extending horizontally under said electromagnet, said armature bar being pivotally mounted outwardly of the electromagnet and having its inner end extending under the chamber and carrying said needle valve, said armature being pivotally mounted in spaced relation to the outer end, a spring urging the outer end of said armature upwardly and yieldably holding the armature away from the magnet at a downward incline towards its inner end, and an abutment under the inner end of the armature limiting downward movement of the armature and the needle valve and being shiftable vertically to adjusted positions.

2. The structure of claim 1 wherein the chamber is carried by a bracket shiftable vertically to adjust the chamber relative to the electromagnet and the abutment consists of a screw threaded upwardly through an opening formed in platform projecting forwardly from the bracket.

CREEDY C. SHEPPARD.

References Cited in the file of this patent

UNITED STATES PATENTS

| Number | Name | Date |
|---|---|---|
| 932,940 | Allen | Aug. 31, 1909 |
| 1,008,201 | Schmucker | Nov. 7, 1911 |
| 1,210,180 | Logan | Dec. 26, 1916 |
| 1,664,840 | Wermine | Apr. 3, 1928 |
| 1,758,450 | Machlet | May 13, 1930 |
| 1,925,833 | French | Sept. 5, 1933 |
| 1,949,685 | Hume | Mar. 6, 1934 |
| 1,951,035 | Parker | Mar. 13, 1934 |
| 1,989,829 | Specht | Feb. 5, 1935 |
| 2,171,312 | Meyers | Aug. 29, 1939 |
| 2,310,298 | Kuhl | Feb. 9, 1943 |
| 2,382,853 | Brammer | Aug. 14, 1945 |
| 2,523,198 | Davies | Sept. 19, 1950 |

FOREIGN PATENTS

| Number | Country | Date |
|---|---|---|
| 839,703 | France | of 1939 |